United States Patent [19]

Weiler

[11] 4,229,944
[45] Oct. 28, 1980

[54] FUEL INJECTION NOZZLE ASSEMBLY FOR GAS TURBINE DRIVE

[75] Inventor: Wolfgang Weiler, Dachau, Fed. Rep. of Germany

[73] Assignee: Motoren- und Turbinen-Union Munchen GmbH, Fed. Rep. of Germany

[21] Appl. No.: 885,189

[22] Filed: Mar. 10, 1978

[30] Foreign Application Priority Data

Mar. 11, 1977 [DE] Fed. Rep. of Germany ....... 2710618

[51] Int. Cl.³ ............................................. F02C 7/22
[52] U.S. Cl. .................................. 60/740; 60/39.51 R
[58] Field of Search ............ 60/39.36, 39.66, 39.74 R, 60/39.51 R; 239/419.3, 424, 424.5, 425; 431/166, 167, 182, 183, 187, 188, 247, 248

[56] References Cited

U.S. PATENT DOCUMENTS

| | | | |
|---|---|---|---|
| 2,519,200 | 8/1950 | Schuman | 239/425 |
| 2,622,395 | 12/1952 | Bowden | 60/39.51 R |
| 2,782,596 | 2/1957 | Lindhagen | 60/39.66 |
| 3,302,397 | 2/1967 | Davidovic | 60/39.66 |
| 3,458,997 | 8/1969 | Clark | 60/39.74 B |
| 3,741,483 | 6/1973 | Kawaguchi | 60/39.74 R |
| 3,763,650 | 10/1973 | Hussey et al. | 60/39.74 B |
| 4,050,239 | 9/1977 | Kappler | 60/39.51 R |
| 4,070,826 | 1/1978 | Stenger et al. | 60/39.74 R |

*Primary Examiner*—Robert E. Garrett
*Attorney, Agent, or Firm*—Craig & Antonelli

[57] ABSTRACT

A fuel injection nozzle assembly for gas turbine drives has an injection nozzle mounted in a structural part forming an outer housing of the combustion chamber of the gas turbine and extends into a primary zone thereof. In order to prevent carbonizing of the nozzle, the nozzle has a cooling passage extending longitudinally therein and communicates with a passage supplying cooling air thereto. Advantageously, according to a preferred embodiment, the injection nozzle is formed by a central body having a fuel supply passage therein and an outer shielding member such that the cooling air passage is defined between the outer shielding member and the central body. Additionally, the central body is formed of material having the high thermal conductivity of copper while the outer shielding member is formed of a material having the high temperature resistivity and low thermal conductivity of nickel alloys.

4 Claims, 4 Drawing Figures

FUEL INJECTION NOZZLE ASSEMBLY FOR GAS TURBINE DRIVE

BACKGROUND AND SUMMARY OF THE INVENTION

The invention relates to a fuel injection nozzle for gas turbine drives equipped with at least one heat exchanger for heating the combustion air, whereby the fuel injection nozzle presents an annular conduit that runs coaxially with reference to the longitudinal axis of the nozzle, which can be ventilated by coolant air that is not heated by the heat exchanger.

In gas turbine power plants with heat exchangers, it is frequently observed that the injection nozzles carbonize at the combustion chambers, which leads to a considerable disturbance in operation and even sometimes to engine breakdown. Disturbances of this nature are easy to get rid of, in principle, but depending upon design and construction, a considerable expenditure in time and effort sometimes has to be counted on. In heat exchanger gas turbines with annular reversing combustion chambers, it is customary for example to dispose the annular fuel conduit and the injection nozzles within the engine housing. Cleaning carbonized injection nozzles in this case would entail partial disassembly of the engine, which can practically never be done with built in gas turbines.

The carbonizing of the nozzles occurs from cracking processes, if the fuel in the nozzle system is heated beyond the characteristic temperature for the hydrocarbon in the fuel in question. Highest temperatures usually occur at the nozzle tips: heating occurs there through convection, and particularly from emission from the combustion chamber. For reasons that relate to strength, injection nozzles are generally made of heat-resistant materials which, as a rule, have a rather low coefficient of heat conduction. The result is that in the zones in which the heat occurs, there are localized high temperatures in structural parts, because the heat is not carried off quickly enough to cooler areas, or released to the fuel. This has the consequence that in the lower partial load range (small fuel throughput) and especially after the engine has been cut off (fuel throughput zero), there are conditions at the nozzle tips that crack the fuel, and the troubles that have been mentioned then occur.

The invention is intended to eliminate these drawbacks in the scope of the problem that has been described, and to produce an injection nozzle for gas turbine engines that will be broadly protected from direct impingement of heat and that can be deliberately cooled, whereby especially heat that occurs in the zone of the nozzle tip will be carried off as quickly as possible to cooler structural parts, or cooler engine areas.

To solve this problem according to a preferred embodiment of the invention, the combination of the following features is provided:

(a) The fuel injection nozzle is held in a structural part that in part constitutes the outer housing of the combustion chamber and is integrated in the engine housing, and from there it is taken via a bore in the back wall of the flame tube that receives the primary air supply, into the primary zone of the combustion chamber.

(b) The annular channel of the injection nozzle that can be impinged upon by cool air is disposed between an outer shielding wall and a sleeve-like central body for fuel supply, which is connected with the forward section of the annular channel by means of fuel supply bores in the injection head, and is also connected with the primary zone via intake openings in this region in the shielding wall.

(c) The central body for fuel supply bears exclusively on the outer shielding wall via contact surfaces disposed in the region of the outer housing of the combustion chamber, as well as in the zone of the injection head. The said shielding wall advantageously belongs to the fixed component of the nozzle body, in the region of the combustion chamber that is on the outside of the housing.

The invention otherwise is based on a known fuel injection nozzle as in German Auslegeschrift No. 2,036,756, with the intention of furnishing an advantageous further development of this known solution, especially in the matter of the mentioned invention.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE INVENTION

Figure 2:
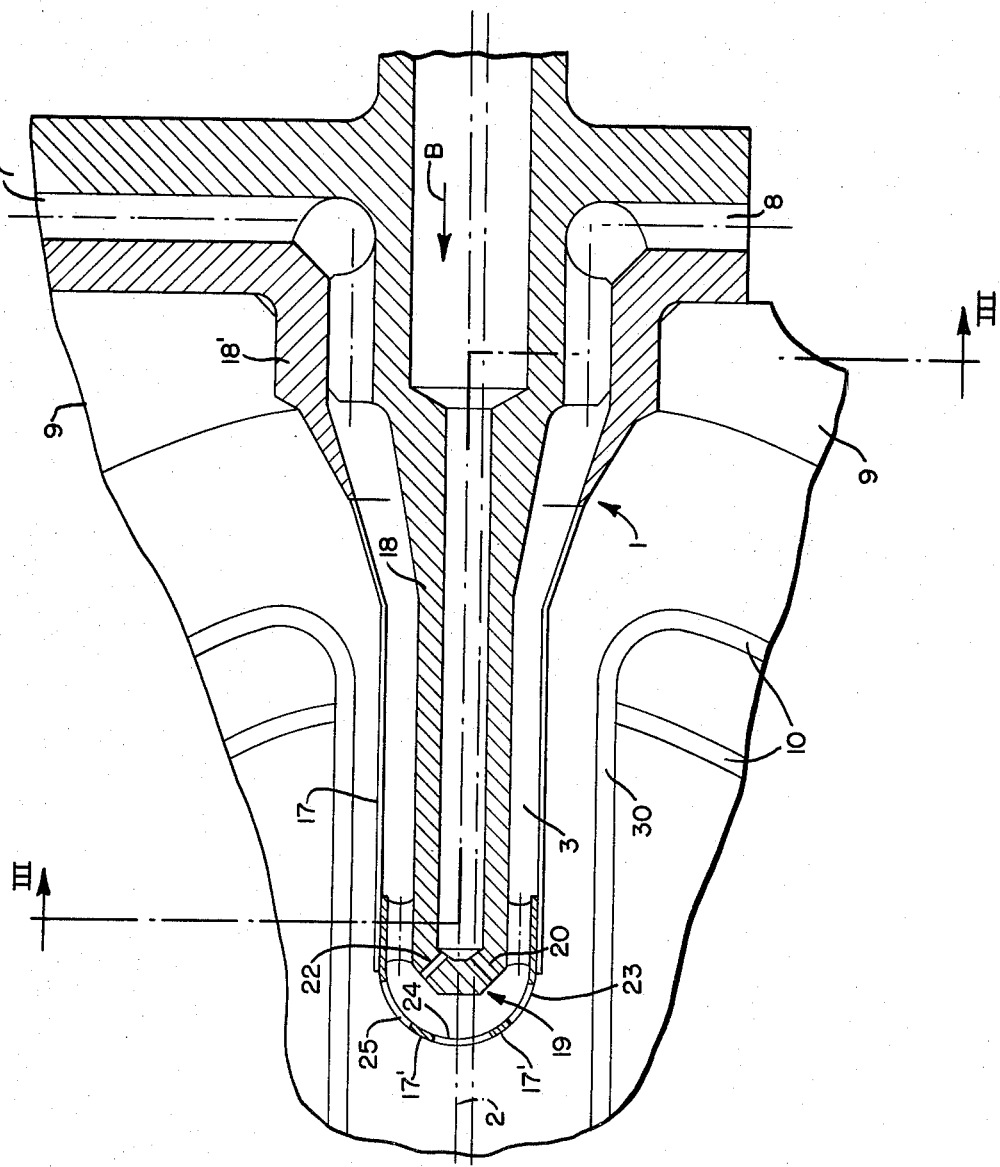
FIG. 2 is on a larger scale than FIG. 1, and shows the injection nozzle with associated details of the combustion chamber and fuel carburetor respectively, as a mid-longitudinal section.

According to FIG. 2, fuel injection nozzle 1 presents an annular channel 3 that runs coaxially to the longitudinal axis 2 of the nozzle, which channel can be impinged upon by cool air that is not heated by the heat exchanger (not illustrated in the drawing).

The cool air is here received directly at the outlet of the compressor and delivered via a conduit 5 integrated into engine housing 4 (FIG. 1) to annular chamber 6, whence the cool air reaches annular channel 3 via cool air supply conduits 7, 8.

Fuel injection nozzle 1 is also confined in a structural part 9 (FIG. 1) integral with engine housing 4, that in part constitutes the outer housing of the combustion chamber, and from said part 9 the nozzle is taken via a primary air supply bore 11 in flame tube back wall 10 of the annular reversing combustion chamber into the primary zone of the combustion chamber. Moreover, fuel injection nozzle 1 penetrates an annular passage 14 that is formed between structural part 9 and the combustion chamber 12 and flame tube 13, said passage 14 being impinged upon by compressor air heated by the heat exchanger via an intake diffuser 15 and a tubular housing inlet piece 16, i.e., it is utilized as combustion and mixture air for the combustion process.

As FIG. 2 also shows, injection nozzle 1 is intended to be disposed between an external shielding wall 17, 18′ and a sleeve-like central body 18 for delivery of fuel—arrow B. The central body 18 is connected with the front section of annular conduit 3 by fuel supply bores 20, 22 in injection head 19, and also with the primary zone via intake openings 23, 24, 25 in zone 17' of the shielding wall.

Figure 3:
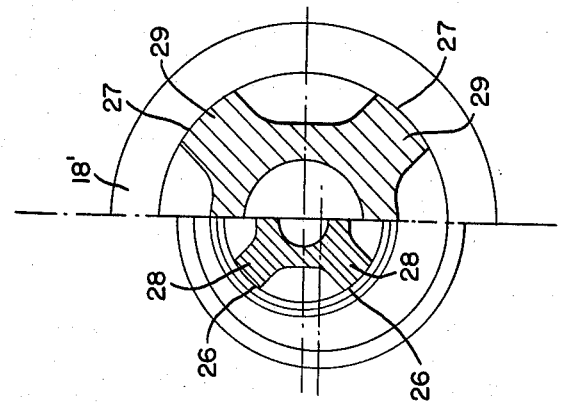
FIG. 3 is a section along III—III of FIG. 2.

In the interest of least possible thermal load, especially in the injection head, the central body 18 bears exclusively via contact surfaces 26 and 27 respectively (FIG. 3) on outer shielding wall 17 and 18', in the region of injection head 19 as well as in the region of the outer housing of the combustion chamber (structural part 9), and the shielding wall advantageously belongs to the fixed component of the nozzle body, in the region of the outer housing side of the combustion chamber. Contact surfaces 26, 27 which are to be as small as possible for the sake of low thermal loading of central body 18 are arranged at equal distances peripherally on projecting crosspieces 28, 29, at the respective locations on central body 18.

Figure 1:
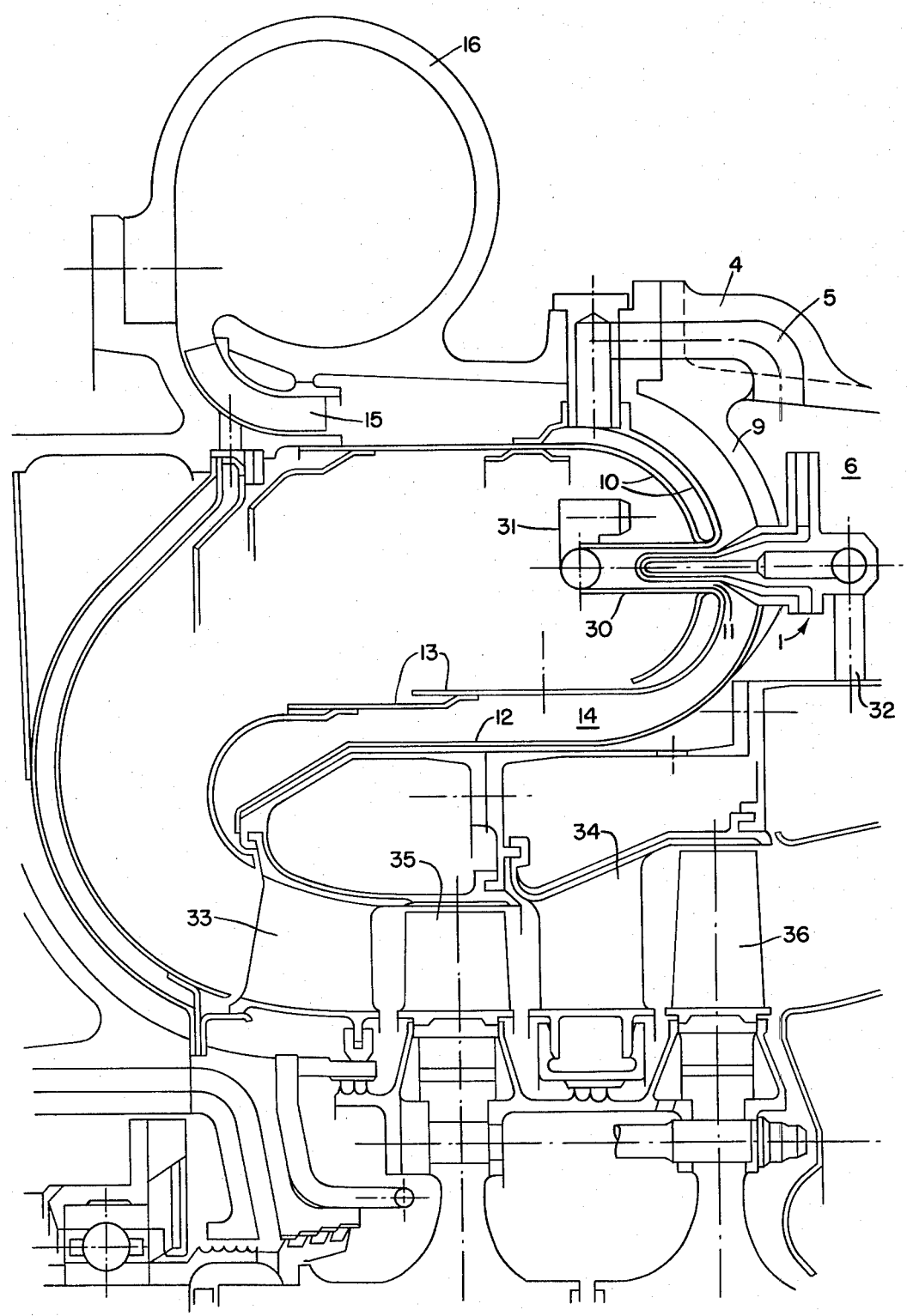
FIG. 1 is mainly a mid-longitudinal section of part of a gas turbine engine, showing an annular reversing combustion chamber with injection nozzle and associated carburetor.

As FIGS. 1 and 2 further indicate, the fuel injection nozzle 1 can be built into pipe 30 of a fuel carburetor which is provided with tube end pieces 31 that are bent down against back wall 10 of the flame tube.

In order, particularly in the zone on the fuel injection side, to carry off heat as rapidly as possible to cooler engine areas, (e.g., nozzle holder, engine housing) central body 18 (burner nozzle assembly) including cool air supply passages 7, 8 for annular chamber 3, which are made as one piece with the finished nozzle body, can be made of a material with a relatively high coefficient of thermal conduction, e.g. a copper alloy, whereas the part of outer shield wall 17 that is to be made separately from the nozzle body can be of a material, e.g. a nickel alloy, that has a relatively low coefficient of heat conduction but a necessary high resistance to heat.

For example, in an annular reversing combustion chamber as in FIG. 1, obviously the use of a plurality of such fuel injection nozzles is provided, and they are disposed with uniform mutual spacing, coaxially to the longitudinal axis of the engine and interconnected by a common annular fuel conduti 32. This arrangement of a plurality of fuel injection nozzles is schematically illustrated in FIG. 4.

Figure 4:
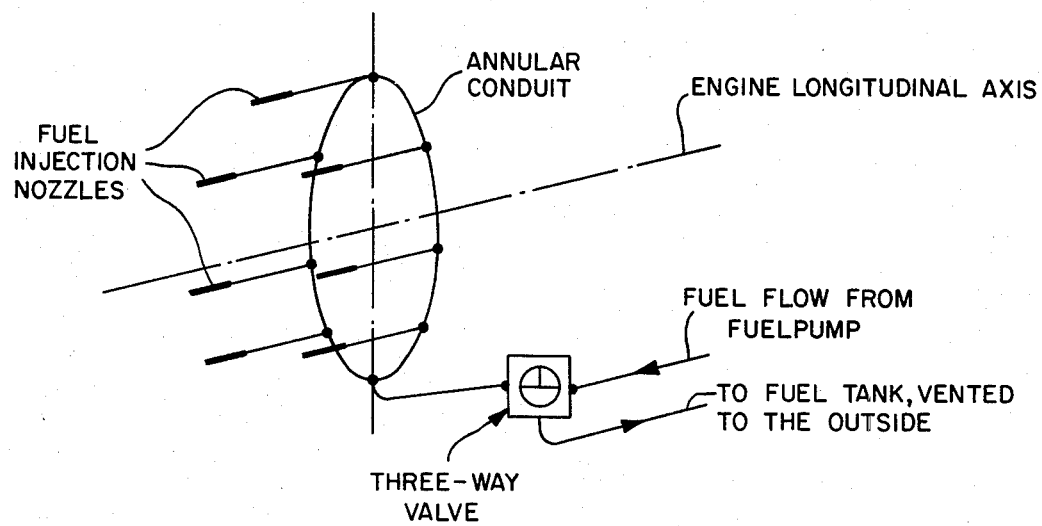
FIG. 4 is a schematic illustration of an embodiment of the present invention wherein plural fuel injection nozzles are utilized.

As is further shown in FIG. 4 of the drawings according to the invention—as a supplementary measure to prevent carbonizing of the injection nozzles—the fuel injection system (nozzle plus annular conduit), after the drive is cut off, can be connected with the outside air or with the fuel tank that is vented to the outside, by switching a three-way valve 40.

This valve 40 is to be switched in such a way that during normal operation there will be throughput from the fuel pump to the injection nozzle or to the annular conduit with the nozzles. When the engine is cut off, with the stop signal, the three-way valve 40 will switch over so that the injection nozzle and possibly the injection nozzle with the annular fuel conduit will be connected with the fuel tank, possibly with the outside. Since during the running out of the gas generator, the pressure in the combustion chamber zone will still be higher than in the tank or in the engine zone, the fuel in the injection nozzle or in the nozzles and annular fuel conduit will be forced out of the engine. Here the nozzles will automatically be blown through, and carbonizing of the nozzles while the gas turbine is stopped will be excluded, immediately after cutoff. In order that in the case of combustion chambers with a plurality of injection nozzles (e.g., reverse combustion chambers) all nozzles may be protected against carbonizing, it is necessary to have fuel feed in the annular fuel conduit at its lowest part.

In the gas turbine drive of FIG. 1 for example there can be an assembly with a single shaft gas generator, comprising a radial compressor (not illustrated), the annular reversing combustion chamber of FIG. 1, as well as the compressor drive turbine partly shown in FIG. 1 with its vanes and blades, designated serially as 33, 34 and 35, 36. The compressor drive turbine can have a freely borne working turbine downstream of it. The exhaust gases leaving the working turbine—before the flow to the outside via an exhaust line—will be taken to a heat exchanger, e.g. made as a recuperative heat exchanger through which air delivered by the radial compressor simultaneously flows—before entrance into the combustion chamber. This way, the combustion air will mainly be delivered to the combustion chamber preheated by part of the heat in the exhaust.

In the scope of the invention, for more intensive cooling and least possible danger of carbonizing of the injection nozzle, it is important that the air used for nozzle cooling be taken at the compressor outlet and delivered directly for cooling purposes, bypassing the heat exchanger.

The invention can be used for all types of gas turbine power plants, whether they be "small gas turbine drives" or gas turbojet drives for aircraft.

In the latter case the injection nozzles according to the invention can be used with great advantage although for example a heat exchanger system of the described type would not be provided. In this case, cooling of the cool air led into annular conduit 3 of the nozzle with fuel, for instance, would be an advantage.

The fuel injection nozzle arrangement of the invention can be used advantageously in other kinds of combustion chambers, for example, in true annular combustion chambers which have axial throughput in the direction of the main flow of the drive, or in individual or tube combustion chambers or in "combined ring-tube combustion chambers."

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A fuel injection nozzle assembly for gas turbine drives of the type having at least one heat exchanger for heating the combustion air, and a fuel injection nozzle which includes an annular conduit that runs coaxially to the longitudinal axis of the nozzle between an outer shielding wall and a sleeve-like central body having a passage for fuel supply, said annular conduit being ventilated by cool air that is not heated by the heat exchanger, characterized by the combination of the following features:

(a) the fuel injection nozzle is confined in a structural part that is integrated in the engine housing, forming part of an outer housing of a combustion chamber, and from there the nozzle extends via a primary air supply bore in a back wall of a flame tube, into a primary zone of the combustion chamber;

(b) the ventilated annular conduit of the injection nozzle is connected directly to a compressor end of the turbine drive and said central fuel supply passage is connected with a frontal section of the annular conduit via fuel supply bores in an injection head, and also with the primary zone by means of intake openings in the shielding wall;

(c) the central body for fuel supply engages the outer shielding wall exclusively via localized contact surfaces on the ends of cross-pieces protruding radially from the central body and located in the region of the injection head and said engine housing integrated structural part; and (d) wherein said outer shielding member is formed of a material having the high temperature resistivity and low thermal conductivity of nickel alloys, and said central body is formed of a material having the high thermal conductivity of a copper alloy, whereby heat will be caused to flow from the injection head to the engine housing so as to act to prevent fuel carbonization.

2. A fuel injection nozzle assembly as in claim 1, characterized by the use of a plurality of such fuel injection nozzles, said nozzles being interconnected by a common annular fuel conduit, and wherein said combustion chamber is a reversing annular combustion chamber.

3. A fuel injection nozzle assembly as in claim 1 or 2, comprising a three way valve means, connected with the atmosphere, the nozzle and a fuel source, for connecting the nozzle with the fuel source for driving the turbine drive or with the atmosphere after the drive has been cut off.

4. A fuel injection nozzle assembly as in claim 1, characterized in that the injection nozzle extends into a pipe of a fuel carburetor.

* * * * *